UNITED STATES PATENT OFFICE.

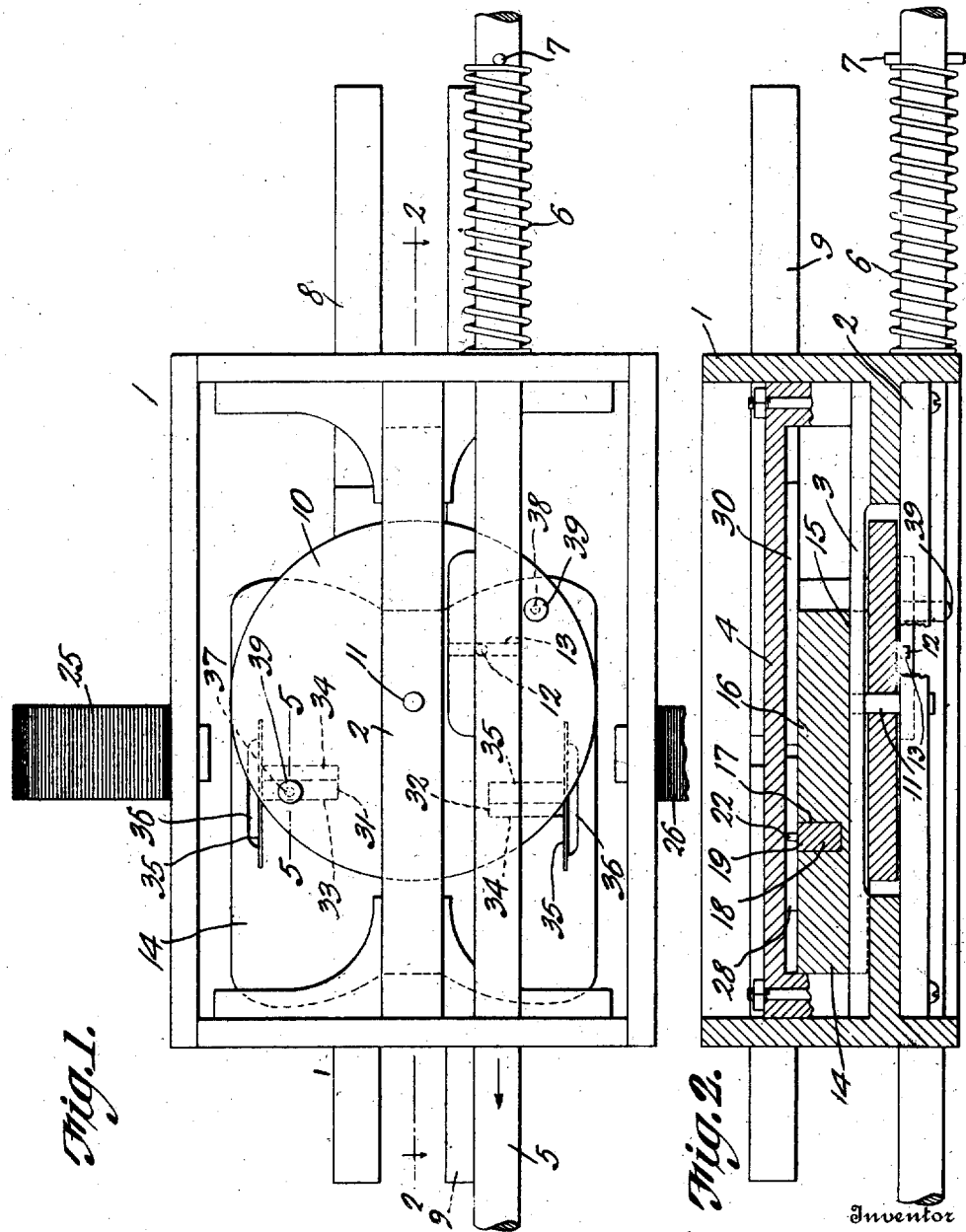

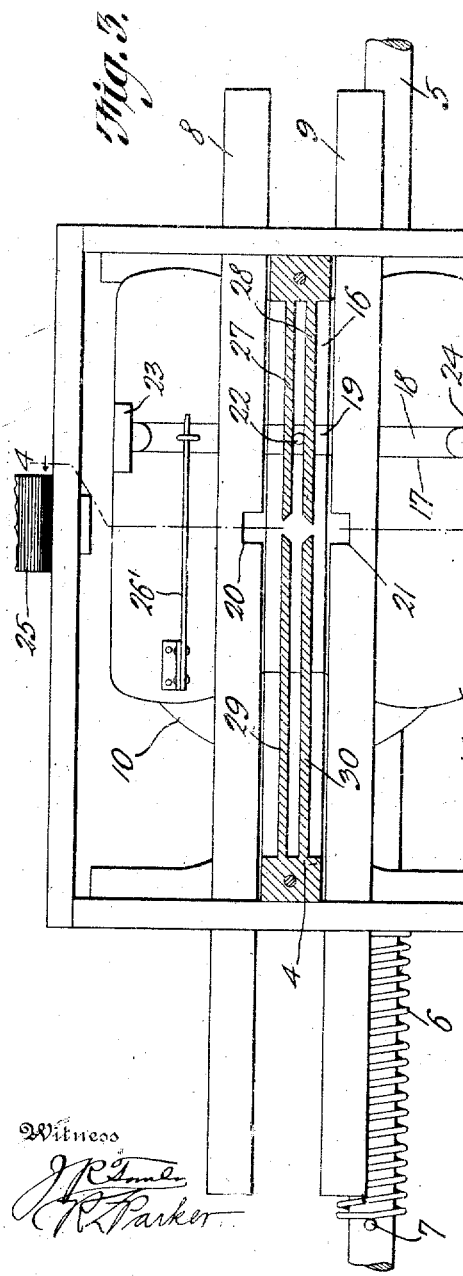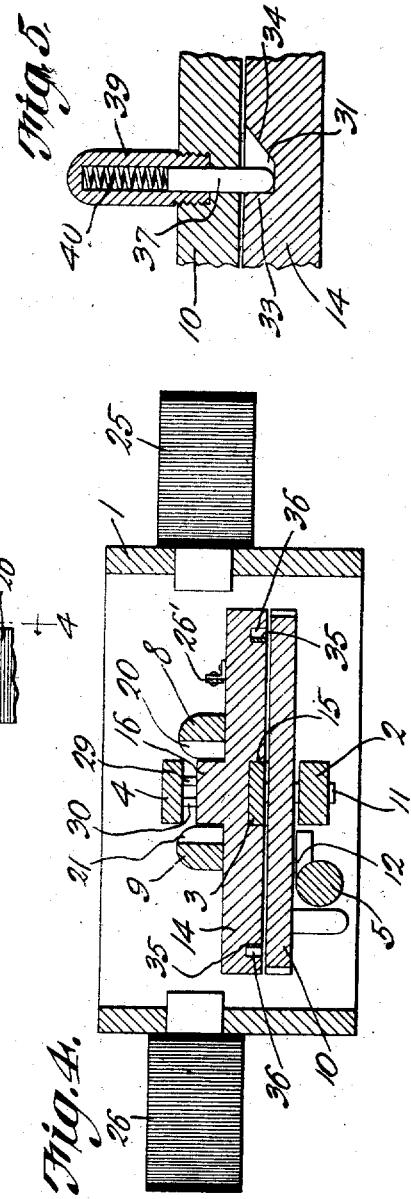

JAMES SHELLENBARGER ALSPAUGH, OF PORTSMOUTH, OHIO.

AUTOMATIC GEAR-SHIFT CONTROL.

1,257,064.  Specification of Letters Patent.  Patented Feb. 19, 1918.

Application filed March 3, 1917. Serial No. 152,377.

*To all whom it may concern:*

Be it known that I, JAMES SHELLENBARGER ALSPAUGH, a citizen of the United States, residing at Portsmouth, in the county of Scioto and State of Ohio, have invented a new and useful Automatic Gear-Shift Control, of which the following is a specification.

The present invention has for its object the provision of an automatic controlling device for shifting the gears of a transmission mechanism of an automobile or other machine, although useful for various other purposes, the construction being such that the transmission mechanism or the like is operated by the operation of a foot pedal or other operating member in connection with electro-magnets or their equivalents, whereby the repeated operation of the operating member can be made, through the energization of the electro-magnets, to change the speed progressively, or to reverse the machine.

A further object of the invention is the provision in a controlling device of the nature indicated, of novel mechanical movements, to enhance the utility and efficiency of the device.

Another object of the invention is the provision of novel means for alternately moving one member, first in one direction by the complete forward and backward movement of another member, and then in the opposite direction by the complete forward and backward movement of the second mentioned member, in order that the first mentioned member is moved alternately in opposite directions during the movement of the second mentioned member in the same direction during its forward and backward movements.

A still further object of the invention is the provision of novel means under the control of electro-magnets or the like, for moving a plurality of members in different directions by the movement of another member, there being novel means for connecting the first and second mentioned members controlled by the electro-magnets or their equivalents.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a plan view of the device.

Fig. 2 is a longitudinal section taken on the line 2—2 of Fig. 1.

Fig. 3 is a bottom view, portions being shown in section.

Fig. 4 is a cross section taken on the line 4—4 of Fig. 1, showing the parts in neutral or intermediate position.

Fig. 5 is an enlarged sectional detail taken on the line 5—5 of Fig. 1.

In carrying out the invention, there is provided a suitable frame 1, which is of rectangular form as illustrated, and which is provided with the parallel longitudinal bars 2, 3 and 4 extending from one end to the other. An actuating rod 5 is slidable longitudinally through the ends of the frame at one side of the bar 2. A pair of longitudinal actuated rods 8 and 9 is slidable through the ends of the frame at the opposite sides of the bar 4, and the invention embodies a special operative connection between the rod 5 and the rods 8 and 9 for operating the latter by the operation of the former. The rod 5 can be operated by a foot pedal or other suitable operating member (not shown) connected thereto, to move the rod 5 toward the left, as seen in Fig. 1, against the tension of the spring 6 which moves the rod 5 in the other direction when the rod is released. The spring 6 can be disposed between one end of the frame 1 and a pin 7 engaging the rod 5. The rods 8 and 9 can be connected to the transmission mechanism (not shown) or other suitable appliance for controlling the same. For example, one of the rods 8—9, which are normally in intermediate position, when moved in one direction will provide first or low speed, and when moved in the opposite direction from intermediate position will provide for reversed motion, while the other rod in being moved in opposite directions will provide second or intermediate speed and third or high speed, so that by reciprocating the rods 8 and 9 in opposite directions from their neutral position, the transmission mechanism can be controlled.

An oscillatory disk 10 is mounted between the bars 2 and 3 upon a pivot pin 11 engaged through said bars and disk, and is operatively connected with the reciprocatory rod 5, whereby the reciprocation of said rod imparts an oscillatory movement to the disk. Thus, the rod 5 is provided with a transverse slot 12 engaging a pin or lug 13 extending from the face of the disk across which the rod 5 extends.

A reciprocatory slide 14 is actuated by the disk 10, and is movable longitudinally within the frame between the bars 3 and 4, said slide having a longitudinal groove 15 receiving the bar 3, and having a longitudinal rib 16 slidable between the rods 8 and 9, whereby to guide the slide for longitudinal movement. This slide 14 carries means for connecting it to either of the rods 8 and 9, and for this purpose, the slide 14 has a transverse channel or slot 17 in which a transverse clutch bar 18 is slidable. The clutch bar 18 is provided with a lug 19 projecting between the rods 8 and 9 to alternately engage notches 20 and 21 with which the respective rods 8 and 9 are provided. The lug 19 has a pin or stud 22 projecting therefrom. When the bar 18 is moved in one direction the lug 19 is adapted to enter the notch 20 to cause the rod 8 to move with the slide 14, and when the bar 18 is moved in the other direction, the lug 19 enters the notch 21 so that the rod 9 will move with the slide.

As a means for moving the bar 18 in one direction or the other, said bar is provided adjacent to its ends with armatures 23 and 24 movable past electromagnets 25 and 26, respectively, carried by the sides of the frame. Thus, when the slide 14 is reciprocated, the armatures are carried past the poles of the magnets in order that when one magnet is energized, the corresponding armature will be attracted to move the bar 18 in the corresponding direction. For example, when the magnet 26 is energized, it will attract the armature 24 to move the bar 18 so that its lug 19 engages the notch 21, but when the magnet 25 instead of the magnet 26 is energized, the armature 23 will be attracted to move the bar 18 in the opposite direction so that the lug 19 engages the notch 20. A leaf spring 26' or other suitable means carried by the slide 14 has its free end connected with the bar 18 to move said bar to intermediate position when the electro-magnets are deënergized. This spring tends to move the bar 18 to and hold it at intermediate position so that the lug 19 will move past the notches 20 and 21 without engaging them when the magnets are deënergized.

As a means for holding the bar 18 toward one side or the other after being moved by one magnet, pairs of longitudinal rails 27—28 and 29—30 are carried by the bar 4. The rails of each pair are disposed side by side and the adjacent ends of the rails of the two pairs are spaced apart. The pin 22 normally moves between the rails of the two pairs when the bar 18 is in intermediate position. When the rods 8 and 9 are in intermediate position, their notches 20 and 21 are at opposite sides of the space between the adjacent ends of the rails 27—28 and 29—30, and the magnets 25 and 26 are on the transverse line of the notches 20 and 21 when in intermediate position. Thus, as the slide 14 is moved, the bar 18 when brought between the magnets, will bring the lug 19 between the notches 20—21 to engage either of them, and the pin 22 will also be between the adjacent ends of the two pairs of rails, thus enabling the bar 18 to be moved in either direction by one magnet or the other, but if the magnets are both deënergized, the bar 18 will remain in intermediate position.

A special operative connection between the disk 10 and slide 14 is provided whereby when the rod 5 and disk 10 are moved backward and forward one time, the slide 14 is slid in one direction, and when said rod and disk are moved back and forward the second time, the slide 14 is moved in the opposite direction. In other words, as the rod 5 is moved repeatedly by the spring 6, the slide 14 is alternately moved backward and forward, due to the operative connection between the disk 10 and slide or plate 14. Thus, the slide 14 is provided adjacent to its opposite side edges with transverse recesses 31 and 32, each having a square shoulder 33 and an opposite beveled surface 34, said shoulders and surfaces of the two recesses being in reversed position. The slide 14 has leaf springs 35 embedded therein, with their ends seated within the slide, and said slide has recess 36 at those sides of the intermediate portions of the springs opposite to the recesses 31—32. The springs 35 extend across the outer ends of the recesses 31—32 and are adapted to be sprung or bowed into the recesses 36 away from the recesses 31—32. A pair of latches or latch pins 37—38 is carried by the disk 10 at diametrically opposite points thereof, said latches being slidable within cup-shaped guides 39 threadedly or otherwise engaged with the disk 10, and expansion springs 40 are confined within the guides 39 to project the latches against the slide 14. The latches 37 and 38 are adapted to snap alternately into the recesses 31 and 32, respectively, as the disk 10 is oscillated and, under certain conditions the latches 37—38 slide over the springs 35 without entering the recesses. Thus, with the parts arranged as shown in Fig. 1, with the latch 37 projected into the recess 31, when the rod 5 is moved by the pedal or operating member toward the left, this will move the latch 37 toward the right and the latch 38 toward the left. The latch 37 will ride-up the beveled surface 34 of the recess 31 onto the face of the slide 14 without moving said slide with the latch 37, while the latch 38 which bears against the slide will be moved toward the recess 32 and when the movement of the rod 5 and disk 10 in the corresponding direction is completed, the latch 38 will spring into the recess 32 behind the shoulder 33 thereof. Then, when the rod 5 is released so as to be moved under the influence of the spring 6, the slide 14 will be moved toward the right with the latch 38. The slide 14 is thus moved during the return movement of the rod 5, whereas it did not move when the rod 5 was moved against the tension of the spring 6 toward the left. During the movement of the latch 38 and slide 14 toward the right, the latch 38 pressing against the respective spring 35 will bow it outwardly as the parts pass intermediate position, while the latch 37 which is moving toward the left as the spring 35 of recess 31 moves toward the right, will cause the latch 37 to ride over the edge of the spring 35 without entering the recess 31. The latch 37 thus passes the recess 31 without entering it. Said spring 35 therefore holds the latch 37 retracted during the movement of the slide 14 with the latch 38. The slide 14 is therefore moved toward the right with the latches 37 and 38 in the position seen in Fig. 1. When the rod 5 is moved to the left the second time, the latch 37 will move up the beveled surface 34 of the recess 32 and onto the face of the slide 14 without moving the slide 14 to the left with the latch 38, and the latch 37 will be moved toward the right and will snap into the recess 31. Now, when the rod 5 is released and moved by the spring 6, the slide 14 will be moved toward the left with the latch 37 to the position seen in Fig. 1, and during the movement of the latch 38 toward the right it will slide over the spring 35 in recess 32, to prevent the latch 38 from entering said recess 32 as they pass each other. The cycle of movements of the disk 10 and slide 14 is thus completed, it being noted that when the rod 5 is moved against the tension of the spring, one latch is removed from one recess of the slide and the other latch is moved into the other recess of the slide, to carry the slide with it during the return movement of the disk 10 and rod 5, the operation being reversed during the next back and forth movement of the rod 5. Thus, when the rod 5 is moved the first time by the spring 6, the slide 14 is moved in one direction, and during the next movement of the rod 5 by the spring 6, the slide 14 is moved in the opposite direction, the direction of movement of the slide 14 alternating during the successive movements of the rod 5 in the same direction by the spring 6.

In operation, supposing that it is desired to first move the rod 8 toward the left, as seen in Fig. 3, to provide first or low speed, to then move the rod 9 in one direction to provide second or intermediate speed, and to then operate the rod 9 in the opposite direction to provide third or high speed, the rod 5 is moved against the tension of the spring 6 and is then released, causing the slide 14 to be moved toward the left, as seen in Fig. 3. In the meantime, the magnet 25 is energized by closing the circuit thereof (not shown), as will be readily understood, and as the slide 14 moves past intermediate position, the magnet 25 will attract the armature 23 and move the clutch bar 18 toward the magnet 25. The lug 19 therefore enters the notch 20, and the pin 22 is brought to the outer side of the rail 29, and as the slide 14 completes its movement, the pin 22 will slide along the outer side of the rail 29, thereby preventing the bar 18 from returning to intermediate position under the influence of the spring 26', after the armature 23 has moved past the magnet. This holds the bar 18 in engagement with the rod 8 during the time that the parts are beyond intermediate position, and the rod 8 will naturally move with the slide 14. The rod 8 is therefore moved toward the left, from intermediate position. The next time the rod 5 is moved back and forth, the slide 14 is moved toward the right, as seen in Fig. 3, thereby carrying the rod 8 toward the right in intermediate position. The magnet 25 being deënergized will result in the bar 18 moving to intermediate position, since the pin 22 can now move past the end of the rail 29 to a point on a line intermediate the rails, the lug 19 therefore being removed from the notch 20 to let the rod 8 stand at intermediate position. Now, if the magnet 26 is energized, during the movement of the slide 14 toward the right, the bar 18 will not only be moved to intermediate position, but will be moved farther by the attraction of the armature 24 to the magnet 26, and the lug 19 will therefore be moved into the notch 21 to carry the rod 9 toward the right with the slide 14, the pin 22 being moved or slid along the other side of the rail 28 to hold the bar 18 in engagement with the rod 9 after the armature 24 has passed the magnet 26. During the next backward and forward movement of the rod 5, the slide 14 will move toward the left, and if the magnet 26 is energized, it will attract the armature 24 to prevent the bar 18 returning to intermediate position as the slide moves past intermediate position, and the lug 19 will therefore be retained in engagement with the notch 21, the pin 22 being moved across the space between the rails 28 and 30 against the outer side of the rail 30. The rod 9 is therefore not only moved toward the left to intermediate position, but is moved to the left from intermediate position. By again operating the rod 5, to move the slide 14 toward the right, with the magnet 26 deënergized, the bar 18 will return to normal position when the slide passes intermediate position, the parts being restored to the position seen in Fig. 3.

Having thus described the invention, what is claimed as new is:—

1. A device of the character described, embodying two members each movable back and forth, and latches carried by one member and movable in opposite directions relatively to the other member, the last mentioned member having means for the engagement of said latches alternately during the successive movements of the first mentioned member in the same direction and for preventing the engagement of the latches during the movement of the first mentioned member in the other direction.

2. A device of the character described, embodying two members, one mounted for oscillation and the other for reciprocation, latches carried by one member and movable in opposite directions relatively to the other member, the last mentioned member having shoulders for the alternate engagement of the latches during the successive movements of the latch carrying member in the same direction, having beveled surfaces for disengaging the latches when moved away from the shoulders, and having means for preventing the latches engaging the shoulders during the movement of the latch carrying member in the other direction.

3. A device of the character described embodying an oscillatory member, a reciprocatory member having recesses each having a shoulder and an opposite beveled surface, the shoulders and beveled surfaces of the two recesses being reversed, latches carried by the oscillatory member to snap into said recesses, and means for preventing the movement of each latch into the corresponding recess during the return movement of the members.

4. A device of the character described embodying an oscillatory member, a reciprocatory member having opposite recesses each provided with a shoulder and an opposite beveled surface, said shoulders and beveled surfaces of the two recesses being in reversed position, leaf springs carried by the reciprocatory member and extending across the ends of said recesses, and spring pressed latches carried by the oscillatory member at opposite points to snap into said recesses and adapted to ride over said leaf springs past the recesses.

5. A device of the character described embodying a member movable back and forth and normally in intermediate position, a second member movable back and forth past intermediate position, means carried by one member to engage the other when the second mentioned member moves past intermediate position, and electro-magnetic means controlling the operation of said means.

6. A device of the character described embodying a member movable back and forth and normally in intermediate position, a second member movable back and forth past intermediate position, a spring pressed clutch member carried by the second mentioned member normally in released position and engageable with the first mentioned member when the second mentioned member moves past intermediate position, and electro-magnetic means for moving said clutch member into engagement with the first mentioned member when the second mentioned member moves past intermediate position.

7. A device of the character described embodying a member movable back and forth and normally in intermediate position, a second member movable back and forth past intermediate position, a clutch member carried by the second mentioned member to engage the first mentioned member when the second mentioned member moves past intermediate position, spring means tending to release the clutch member from the first mentioned member, means for moving the clutch member into engagement with the first mentioned member, and means for retaining the clutch member in engagement with the first mentioned member when the first mentioned member is out of intermediate position.

8. A device of the character described, embodying a member movable back and forth and normally in intermediate position, a second member movable back and forth past intermediate position, a clutch member carried by the second member to engage the first mentioned member when the second mentioned member moves past intermediate position, means tending to move the clutch member out of engagement with the first mentioned member, electro-magnetic means for moving the clutch member into engagement with the first mentioned member, and means for retaining the clutch member in engagement with the first mentioned member when it is out of intermediate position.

9. A device of the character described, embodying a member movable back and forth and normally in intermediate position, a second member movable back and forth past intermediate position, a clutch member carried by the second mentioned member and movable into engagement with the first mentioned member when the second mentioned member moves past intermediate position, spring means for moving the clutch member away from the first mentioned member, an electro-magnet, an armature carried by the clutch member movable past the electro-magnet when the second mentioned member moves past intermediate position, the armature when attracted by the magnet serving to move the clutch member into engagement with the first mentioned member, and rails extending from an intermediate position, the clutch member having a portion movable between the adjacent ends of the rails when the armature is attracted by the magnet, said portion being movable along the rails to hold the clutch member in engagement with the first mentioned member when the first mentioned member is out of intermediate position.

10. A device of the character described, embodying a pair of members movable back and forth and normally in intermediate position, a third member movable back and forth past intermediate position, a clutch member carried by the third member normally in released position to alternately engage said pair of members when the third member moves past intermediate position, and electro-magnetic means operable for moving the clutch member in one direction or the other as the third member moves past intermediate position.

11. A device of the character described, embodying a pair of members movable back and forth, a third member movable back and forth, a clutch member carried by the third member to alternately engage said pair of members, means tending to move the clutch member to intermediate position out of engagement with said pair of members, electro-magnetic means for moving the clutch member in one direction or the other in one position of the third member, and means for holding the clutch member in engagement with either of the members of said pair when they are moved with the third member.

12. A device of the character described, embodying a pair of members movable back and forth and normally in one position, a third member movable back and forth, a clutch member carried by the third member and movable alternately into engagement with said pair of members, means tending to move the clutch member to intermediate position, electro-magnets for moving the clutch member in one direction or the other at one position of the third member, and means for retaining the clutch member in engagement with either of said pair of members when they are moved with the third member out of normal position.

13. A device of the character described, embodying a pair of members movable back and forth and normally in intermediate position, a third member movable back and forth past intermediate position, a slidable clutch member carried by the third member and movable alternately in engagement with said pair of members, spring means tending to move the clutch member to intermediate position, electro-magnets for moving the clutch member in one direction or the other when the third member moves past intermediate position, pairs of rails having their adjacent ends spaced apart at intermediate position, said clutch member having a portion normally movable between the rails and movable toward one side or the other to slide along the outer sides of the rails when the clutch member is moved in one direction or the other from intermediate position, to hold the clutch member in engagement with the respective member of said pair.

In testimony that I claim the foregoing as my own, I have hereto affixed my signature in the presence of two witnesses.

JAMES SHELLENBARGER ALSPAUGH.

Witnesses:
 AGNES ROCKELLI,
 MARY WILLIAMS.